United States Patent
Moulin et al.

(10) Patent No.: US 6,596,145 B2
(45) Date of Patent: Jul. 22, 2003

(54) ELECTRODEIONIZATION MODULE

(75) Inventors: Jacques Moulin, Plaisir (FR); Ramesh Hegde, Chelmsford, MA (US); Ven Anantha Raman, Salem, NH (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 09/824,275

(22) Filed: Apr. 2, 2001

(65) Prior Publication Data

US 2002/0139676 A1 Oct. 3, 2002

Related U.S. Application Data

(60) Provisional application No. 60/202,555, filed on May 10, 2000.

(51) Int. Cl.[7] ............................. C02F 1/40; C02F 1/469
(52) U.S. Cl. ...................... 204/634; 204/524; 204/533
(58) Field of Search ................................ 204/524, 533, 204/536, 632, 634

(56) References Cited

U.S. PATENT DOCUMENTS

| | | | |
|---|---|---|---|
| 4,203,848 A | 5/1980 | Grandine | 210/490 |
| 4,632,745 A | 12/1986 | Giuffrida et al. | 204/301 |
| 4,747,929 A | 5/1988 | Siu et al. | 204/301 |
| 4,753,681 A | 6/1988 | Giuffrida et al. | 134/22.17 |
| 4,925,541 A | 5/1990 | Giuffrida et al. | 204/182.5 |
| 4,931,160 A | 6/1990 | Giuffrida | 204/301 |
| 4,956,071 A | 9/1990 | Giuffrida et al. | 204/301 |
| 5,026,465 A | 6/1991 | Katz | 204/182.4 |
| 5,116,509 A | 5/1992 | White | 210/644 |
| 5,154,809 A | 10/1992 | Oren et al. | 204/182.4 |
| 5,211,823 A | 5/1993 | Giuffrida et al. | 204/182.4 |
| 5,259,936 A | 11/1993 | Ganzi | 204/131 |
| 5,531,899 A | 7/1996 | Yen et al. | 210/638 |
| 5,593,563 A | 1/1997 | Denoncourt et al. | 204/524 |
| 5,681,438 A | 10/1997 | Proulx | 204/627 |
| RE35,741 E | 3/1998 | Oren et al. | 204/524 |
| 5,858,191 A | 1/1999 | DiMascio et al. | 204/524 |
| 5,868,915 A | 2/1999 | Ganzi et al. | 204/524 |

FOREIGN PATENT DOCUMENTS

| | | |
|---|---|---|
| EP | 0870533 | 10/1998 |
| GB | 776469 | * 6/1957 |
| GB | 1050960 | 12/1966 |

OTHER PUBLICATIONS

Internation Search Report, Nov. 8, 2001.*
Database WPI, Week 199347, Derwent Publications Ltd., Londong, GB; XP002181393 & JP 05277344 ((Nomu–N) Nomuro Micro Sci KK) Oct. 26, 1993, abstract.*

* cited by examiner

*Primary Examiner*—Patrick Ryan
*Assistant Examiner*—Thomas H. Parsons
(74) *Attorney, Agent, or Firm*—John Dana Hubbard; Paul J. Cook

(57) ABSTRACT

An electrodeionization (EDI) module is formed from an anode spaced apart from a cathode, one or more waste channels formed between the electrodes and a product channel located inward of the waste channel(s). Ion permeable membranes form the boundary between the product channel and the waste channel(s). The product channel and waste channels are filled with a mixture of anionic and cationic ion exchange materials. At least the waste channel(s) and preferably the product channel as well, use either an anion bead having a relatively low affinity for the selected anion specie(s) to be retained (e.g. Type II) or it is a blend with Type I materials. Preferably, the membranes contain an ion exchange material to speed the transfer of ions across them. More preferably, the anionic membrane contains anion materials that have a relatively low affinity for the selected specie or species for retention.

22 Claims, 4 Drawing Sheets

ELECTRODEIONIZATION MODULE

This application claims the benefit of provisinal application Ser. No. 60/202,555 filed May 10, 2000.

BACKGROUND OF THE INVENTION

1. Field of the Invention

The present invention relates to an electrodeionization (EDI) module. More particularly, it relates to an EDI module which has higher rates of ion removal and lower levels of scaling.

2. Description of the Related Art

Electrodeionization (EDI) is a process that removes ionizable species from liquids using electrically active media and an electrical potential between an anode and a cathode to influence ion transport. A typical system has at least one product channel through which liquid to be processed is flowed. At the outer edge of one side of the product channel is an anion permeable membrane which channel defines the outer limit of the product channel on that side. The opposite side of the product channel is defined by a cation permeable membrane. Waste channels are formed on the opposite sides of the membranes from the product channel. The anion side waste channel is formed between the anion permeable membrane and the anode that is spaced outwardly and apart from the anion membrane. Likewise the cation side waste channel is formed between the cation permeable membrane and the cathode.

The product channel is filled with a mixed bed of ion exchange resin ion exchange materials. These ion exchange materials are either anion specific or cation specific. Typically, the anion ion exchange materials are relatively strong in their selection for anions. These ion exchange materials are often referred to as Type I ion exchange materials. Likewise, the waste channels are filled with mixed beds of similar resin.

The liquid to be purified is flowed into the product channel while an electrical potential is applied to the system. The ion exchange materials in the product channel selectively cause the ions in the liquid to attach to the bead surfaces where they are transferred from bead to bead toward the electrode (anode or cathode) they favor. Once they pass through the ion selective membrane, they are passed to ion exchange materials in the waste channels. A liquid is also flowed through each waste channel that removes the ions from the ion exchange materials and carries them to waste.

In practice, the results have been less than completely satisfying. For one reason, each type of bead has a fixed charge and certain affinity for the selected ion. The efficiency with which the ion transport occurs is related to the field efficiency of the system and the binding constant of the resin relative to the selected ion.

The Type I resin used in the current system is a strong anion resin having a relatively high binding constant for certain ions such as bicarbonate ($HCO_3$) (approximately 20) as compared to a hydroxyl ions($OH$) (approximately 1.0).

With this stronger affinity for certain ions such as bicarbonate, the Type 1 resin doesn't easily release the ion causing the ion transport to slow down. To obtain the same efficiency in the system over time as more and more bicarbonate is bound to the resin, one has to increase the power supplied to the system. In areas with high calcium and/or carbon dioxide levels, this may mean that the system needs a voltage increase in under a month and is susceptible to scaling which leads to deterioration of the system's performance. One may use a water softener to reduce the levels of calcium and a degasser to reduce carbon dioxide entering the system, but thisonly delays the inevitable. Additionally, the need to use a water softener and/or degasser also adds to the cost of the system and the softening chemicals and adds to the amount of waste liquid generated by the system.

U.S. Pat. No. 5,868,915 suggests changing a minor amount of the Type I anionic resin in the product and/or waste channel to a weakly ionized type such those with weak base or a Type II resin (7% is the percentage cited in the patent.) Further, it suggests eliminating the use of ion exchange media in the waste channels and using a carbon based electrically conductive bead instead.

U.S. Pat. No. 5,858,191 is similar to U.S. Pat. No. 5,868,915 and adds the suggestion to alternate Type I with Type II anion resins and cationic resin and to use either only cationic resins or alternating layers of cationic and then anionic resins rather than mixed resin beds in the waste channels.

The current systems all have drawbacks. Scaling and the need for additional voltage as they age are the most common. The use of a water softener and/or degasser adds to the overall cost of the system for both hardware and the chemicals needed. Additionally, it leads to a higher amount of waste liquid generated by the system. Moreover, to the inventors' knowledge, systems based on U.S. Pat. Nos. 5,868,915 and 5,858,191 have never been commercialized.

The present invention overcomes the problems of the current system by providing a system that resists scaling and doesn't typically require an increase in voltage as it ages. To the extent that a system does require the use of increased voltage, the time by which it is needed is far longer than that accomplished with today's systems.

SUMMARY OF THE INVENTION

An electrodeionization module is formed having a product channel where the outer sides of the product channel is bordered on each side by an ion permeable membrane, and said membranes define the inner boundary of a first and second waste channel formed outside of the product channel so as to surround it. An anode is located on one side of the first waste channel farthest away from the product channel and the waste channel is defined between the anode an the first ion permeable membrane. The second waste channel is defined between the second membrane and the cathode placed on the side opposite that of the anode beyond the product and waste channels. The product channel is filled with a bed of mixed ion exchange materials of both anion and cation selective types. The waste channels are filled with mixed ion exchange materials wherein the anion ion exchange materials used has a low affinity for the specie or species desired to be captured. Alternatively, it, if desired, may be blended with some amount of Type I ion exchange materials. The membranes are ion selective, the first being anion permeable, the second being cation permeable. Preferably, the membranes contain an ion exchange material to speed the transfer of ions across them. More preferably, the anion permeable membrane contains anion exchange materials that have a low affinity for the selected specie or species for retention.

It is an object of the present invention to provide a system for the electrodeionization of liquids comprising a cathode, an anode spaced apart from the cathode, an electrical potential supplied between the cathode and anode, an anion permeable membrane spaced apart from the anode and defining a first waste channel between the anion permeable membrane and the anode, a cation permeable membrane spaced apart from the cathode and defining a second waste channel between the cation permeable membrane and the cathode, the anion permeable membrane and the cation permeable membrane being adjacent but spaced apart from each other so as to define a product channel, the product channel containing mixed ion exchange materials, the materials being anion selective and cation selective, the first and second waste channels containing a mixed ion exchange materials, the ion exchange materials comprising cation selective ion exchange materials and anion selective ion exchange materials, wherein the anion selective ion exchange materials are selected from the group consisting of anion ion exchange materials having a relatively low affinity for the selected anion (s) of interest and is typically selected from those anion exchange materials which have weakly basic groups, Type II functional groups and mixtures thereof.

It is a further object of the present invention to provide an EDI module comprising one or more product channels, one or more waste channels, an anode, a cathode and mixed ion exchange materials wherein the mixed ion exchange materials in the one or more waste channels are formed of cationic ion exchange materials and anionic ion exchange materials having relatively low affinity for selected specie(s) selected from the group consisting of anion ion exchange materials having weakly base groups, Type II functional groups and mixtures thereof.

It is another object of the present invention to provide a system for the electrodeionization of liquids comprising a cathode, an anode spaced apart from the cathode, an electrical potential supplied between the cathode and anode, an anion permeable membrane spaced apart from the anode and defining a first waste channel between the anion permeable membrane and the anode, a cation permeable membrane spaced apart from the cathode and defining a second waste channel between the cation permeable membrane and the cathode, the anion permeable membrane and the cation permeable membrane being adjacent but spaced apart ion exchange materials from each other so as to define a product channel, the product channel containing mixed ion exchange materials, the ion exchange materials being anion selective and cation selective, the first and second waste channels containing mixed ion exchange materials, the materials comprising cation selective ion exchange materials and anion selective ion exchange materials, wherein the anion selective ion exchange materials are selected from the group consistin[]of anion ion exchange materials having relatively low affinity for the selected specie(s) the resins being selected from resins with weakly basic groups, materials having Type II functional groups and mixtures thereof and the anionic membrane contains an anion ion exchange material having a relatively low affinity for the selected specie(s).

IN THE DRAWINGS

DETAILED DESCRIPTION OF THE DISCLOSURE

Figure 1:
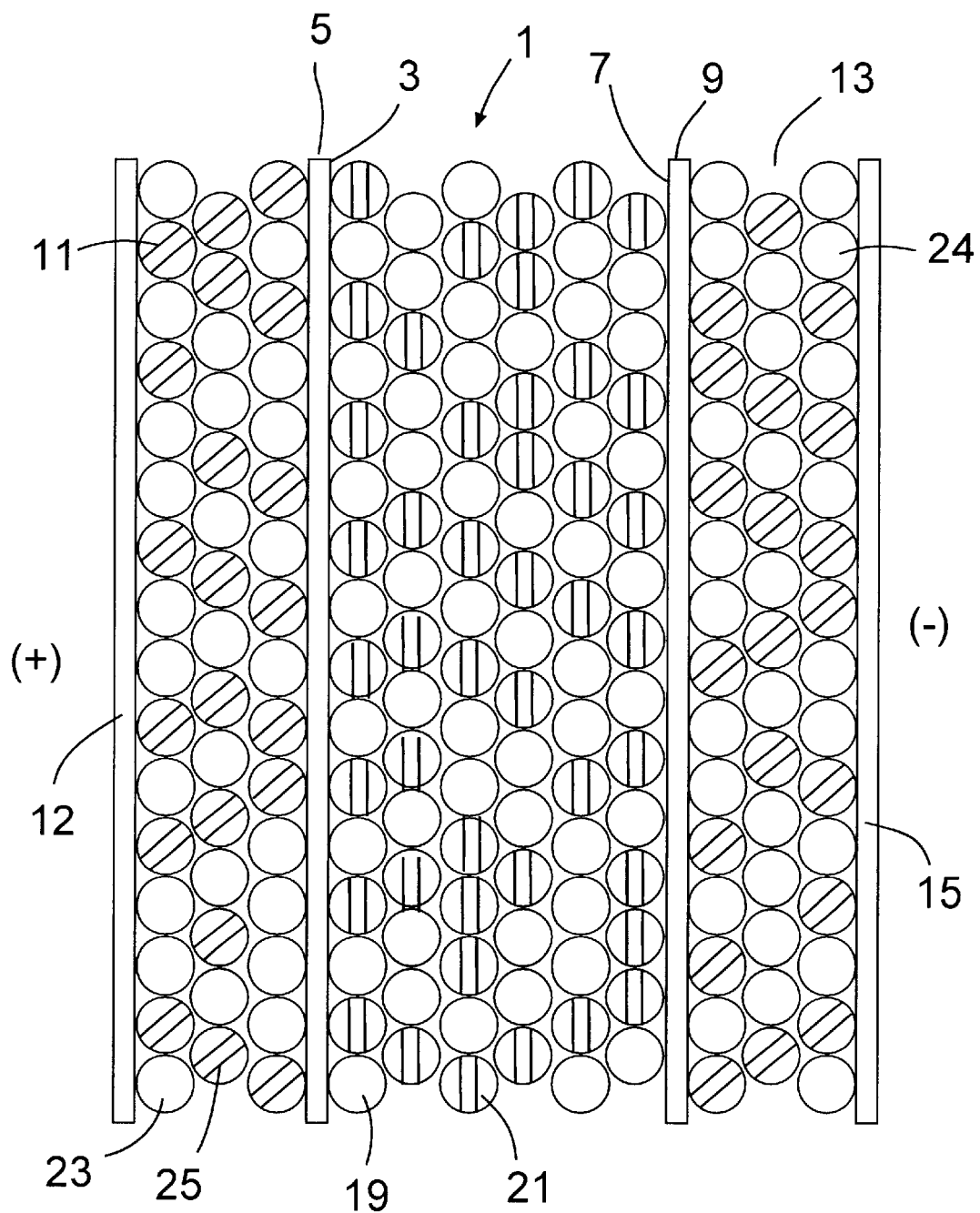
FIG. 1 shows a cross-sectional view of a first embodiment of an EDI module of the present invention.

A typical system of the present invention is shown in FIG. 1 and is very similar to that of the prior art systems except for the selection of the resins in the various channels. A product channel 1 through which liquid to be processed can be flowed has at its first outer edge 3 an anion permeable membrane 5 which defines the outer limit of the product channel on that side. The opposite and second outer edge 7 of the product channel is defined by a cation permeable membrane 9. The two membranes, 5, 9 are spaced apart from each other to define the product channel 1. The width of the space is not critical so long as good liquid flow and ion transfer can be accomplished and it may be the same as that used today with other systems, typically 3–6 bead diameters in width (or 1800 to 3000 microns in width as the average ion exchange materials used today is about 600 microns in diameter). A first waste channel 11 is formed on the opposite side of the anionic membrane 5 and is formed between the anion permeable membrane 5 and the anode 12 that is spaced outwardly and apart from the anion membrane 5. Likewise, the cation side waste channel 13 is formed between the cation permeable membrane 9 and the cathode 15.

The product channel 1 is filled with a mixed bed 17 of ion exchange materials. In this embodiment they are in the form of beads. These beads are either anion specific or cation specific. The anion beads 19 are preferably Type I beads, although Type II beads may be used in small amounts with the Type I beads or by themselves if desired. The others are cation beads 21.

While beads are the most common form of ion exchange materials used, the present invention is not limited to the use of ion exchange materials, either cationic or anionic, in the form. of beads. They may also be in the form of irregular shaped particles, fibers, rods, fabrics or porous monoliths.

The liquid to be purified is flowed into the product channel 1 while an electrical potential is applied to the system. The beads 19, 21 in the product channel 1 selectively cause the ions in the liquid to attach to the bead surfaces where they are transferred from bead to bead toward the electrode (anode or cathode) they favor. Once they pass through the ion selective membrane, either the anion or cation permeable membrane depending on their polarity, (5, 7) they are passed to beads in the form of mixed beds of anion beads 23 and cation beads 25 in the waste channels 11, 13. A liquid is also flowed through each waste channel 11,13 to remove the ions from the beads and carries them to waste.

The anion ion exchange materials used in the present system are comprised of either only anion ion exchange materials having a low affinity for the specie or species desired to be retained or if desired, such materials in combination with Type I ion exchange materials. In a mixture of Type I and "low affinity" anion ion exchange materials, the ratio of Type I to "low affinity" anion ion exchange materials is from about 50:50 to about 1:99. Preferably it is from about 40:60 to about 10:90, more preferably about 25:75 to about 20:80.

By "low affinity anion ion exchange materials", it is meant to include those anion materials that have a relatively low affinity for specific specie(s) of anions to be retained and removed from the product channel, typically carbonate or bicarbonate. Other ions may be the target ions of choice and the anion ion exchange materials should be chosen that have a low affinity for those ions. By the term "low affinity" it is meant any anion selective ion exchange material which has an affinity for the desired specie(s) of anion which is less than that of the Type 1 ion exchange materials. Typically, it would have an affinity of less than 5. Preferably, it would have an affinity of from about 1.01 to about 5, more preferably from about 1.01 to about 3.

Low affinity anion ion exchange materials having a relatively low affinity for most anions, especially carbonate and bicarbonate, include but are not limited to anion ion exchange materials having weakly basic groups, anion ion exchange materials having Type II functional groups and mixtures thereof. Commercially, these ion exchange materials are available from Rohm & Haas of Philadelphia, Pa. under the name of Amberlite 410.

Type 1 ion exchange materials are available from Rohm & Haas of Philadelphia, Pa. under the name of Amberlite 400.

The cation ion exchange materials can be any ion exchange material commonly used in EDI modules to attract and transfer ions from the liquid to the waste channel. A preferred cation ion exchange materials is the Amberlite 200 series of ion exchange materials from Rohm & Haas of Philadelphia, Pa.

Other manufacturers of Type 1 and low affinity anion ion exchange materials and cation ion exchange materials include E. I. Du Pont de Nemours, of Wilmington, Del., Dow Chemicals of Midland, Mich. and various Japanese companies.

The ion exchange capabilities of these materials may be inherent in the chemical structure of the materials used. Alternatively, they can be grafted, crosslinked or otherwise attached to the surfaces of the support material, be it in the form of beads, other particle shapes, fabrics, rods, fibers, monoliths, etc, as discussed above.

The membranes used in the module may be any anion permeable or cation permeable membrane typically used in EDI modules. Such membranes are commercially available from Millipore Corporation of Bedford, Mass. under the CHEMPURE name. Similar membranes are available from Ionics, Inc of Watertown, Mass. and U.S. Filter Corporation of Lowell, Mass.

Preferably however, the anion membranes contain a low affinity anion exchange material to aid in the rapid transfer of the ions from the product channel to the waste channels. It has been determined that the use of anion membranes containing a low affinity ion exchange materials speeds the transfer of the anions across the membrane from the product channel to the waste channels and makes the transfer more complete than using an unfilled membrane or one which uses ion exchanges materials which have a high affinity to the ions that are trying to pass through the membrane toward their selected electrical potential. In particular, it has been found that the incorporation of the low affinity anion ion exchange materials described above is of particular use in reducing the barrier to anion transfer across the membranes. The low affinity anion ion exchange materials may be simply incorporated into the membrane during its manufacture as a filler. If desired, it may be reduced in size such as by grinding or chopping so as to incorporate more material into the membrane and to ensure the material is contained within the depth of the membrane thickness. The inclusion of the ion exchange materials in the manufacture of the membranes especially those formed by casting or melt extrusion methods. See U.S. Pat. Nos. 5,531,899 and 4,203,848, the teachings of which are incorporated herein in their entities by reference, for examples of how such membranes are made.

The method of making the module is well known and it may be done by assembling the various components together and clamping them in liquid tight fit between two end plates made of liquid impermeable material such as stainless steel or by using plastic components that are then sealed by heat or glue or other such means together into an integral, liquid tight assembly. See U.S. Pat. Nos. 4,632,745, 4,747,929, 4,753,681, 4,925,541, 4,931,160, 4,956,071, 5,116,509, 5,154,809 and RE 35,741, 5,211,823, 5,259,936, 5,681,438 and 5,593,563.

Other arrangements of the module may also be used. For example, one may use multiple product channels with their associated waste channels. Alternatively, one may make a half module using one product channel with one waste channel arranged to be closest to the electrode that attracts the ion to be removed. For example, one may simply make a half module that removes anions from the first stage of the EDI system. This may be followed with a series of one or more multi-channeled modules to form an EDI system.

EXAMPLE 1

Two EDI modules according to FIG. 1 were constructed. Both contained a mixed bed of Type 1 anion resin (Amberlite 400) and a cation resin (Amberlite 200). The first module contained the same mixed resin bed in each waste channel. The second module used a mixed bed of cation resin (Amberlite 400) and a low affinity anion resin (Amberlite 410).

Figure 2:
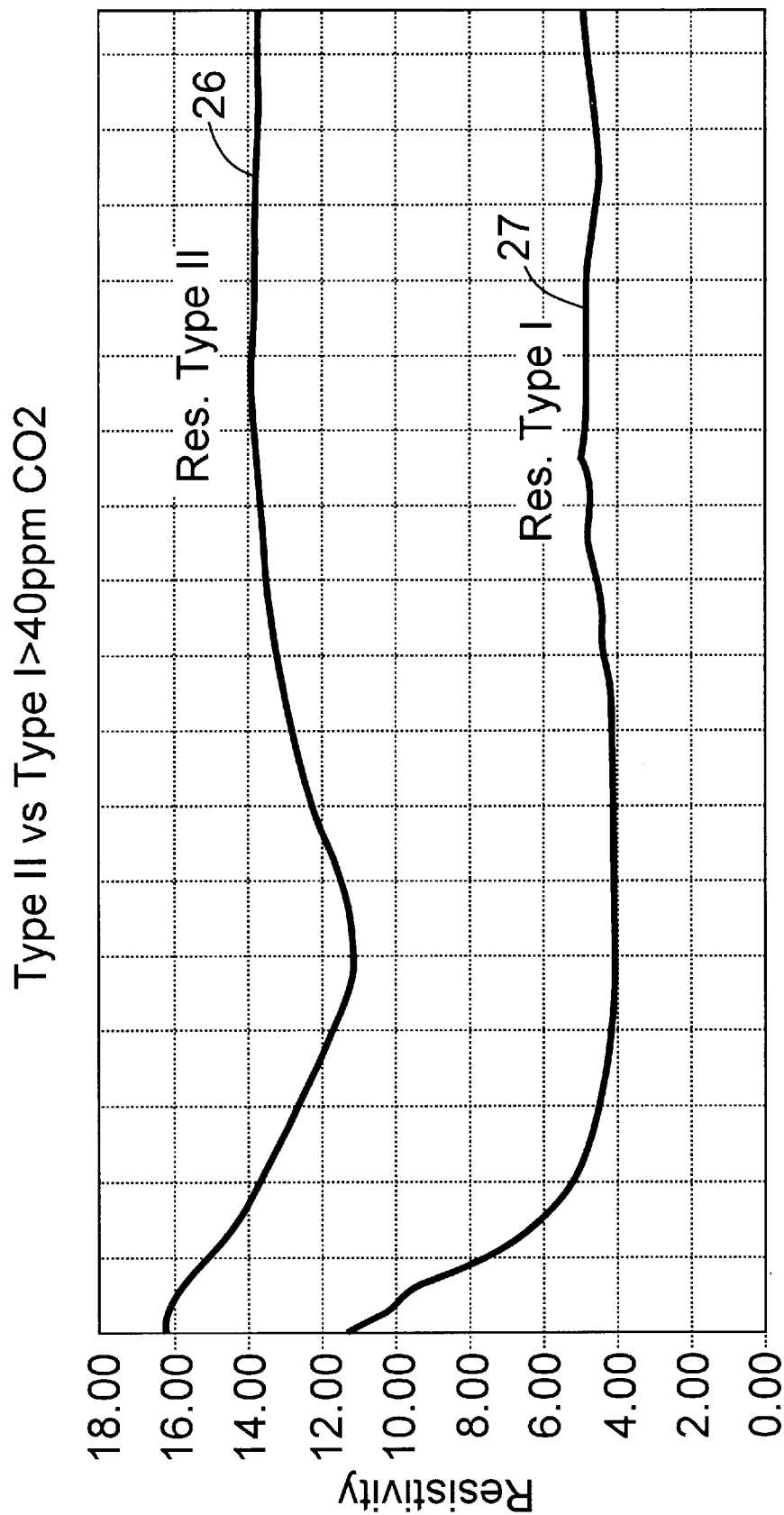
FIG. 2 shows a graph containing data relating to the purity of water obtained by the device of the present invention in comparison to the prior art device over several days.

Both modules were run at the same time using the same water source which contained over 40 ppm of carbon dioxide for three days and resistivity of the water produced (measured in megaohms) was measured at four hour intervals and plotted in FIG. 2. As shown in FIG. 2, the module of the present invention 26 with Type II resin had consistently purer water than the module of the prior art 27 with Type I resin.

EXAMPLE 2

The two modules of each type listed in Example 1 were then run continuously for one month and then intermittently, one hour off, two hours on for an additional seven months. Water was supplied first from a RO (reverse osmosis) feed using well water (St. Quentin, France) for four months, then from a RO feed from municipal water (St. Quentin, France) for one month and then back to the RO feed based on well water (St. Quentin, France) with the water on average containing 1–4 ppm calcium and 25 to 35 ppm carbon dioxide. 100 milliamps current was applied to each module.

Figure 3:
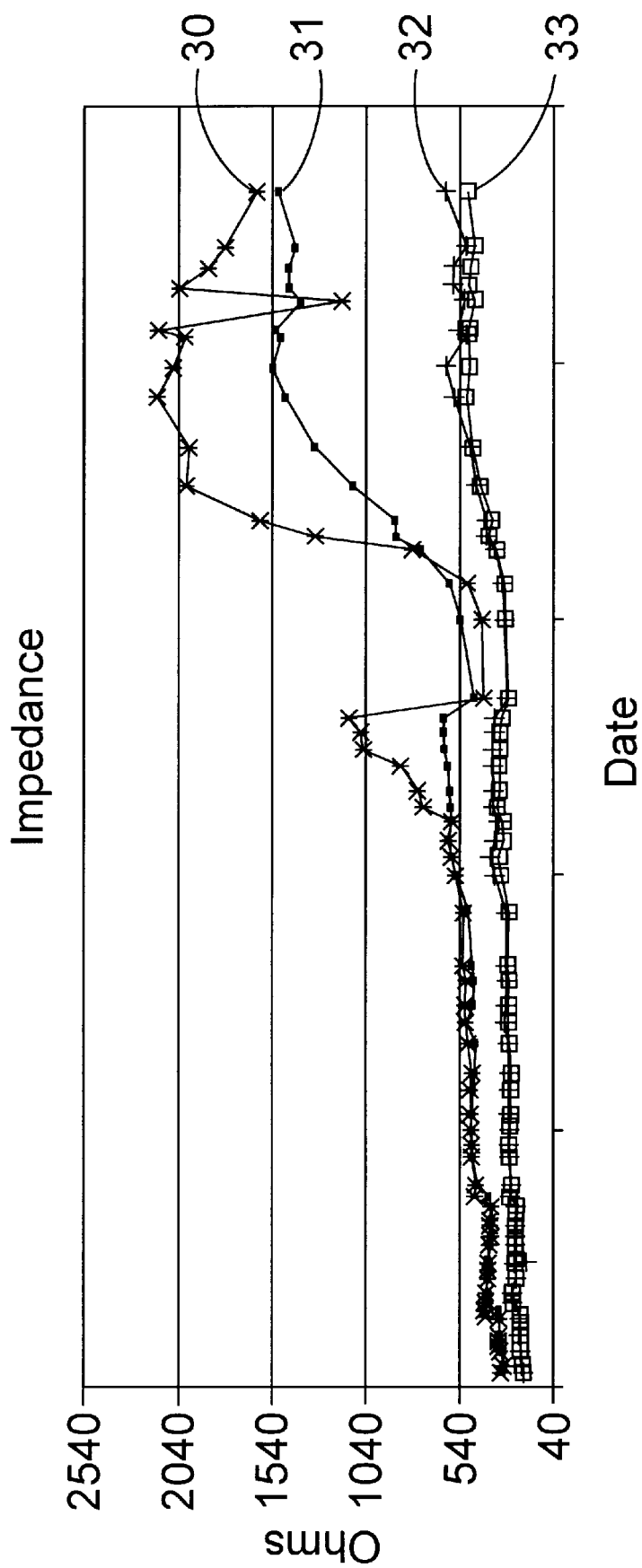
FIG. 3 shows a graph containing data relating to the impedence of the device of the present invention in comparison to the prior art device.

FIG. 3 shows the impedence of the modules over time with the two prior art modules 30 and 31 showing a markedly higher impedence than the two modules of the present invention 32 and 33.

Figure 4:
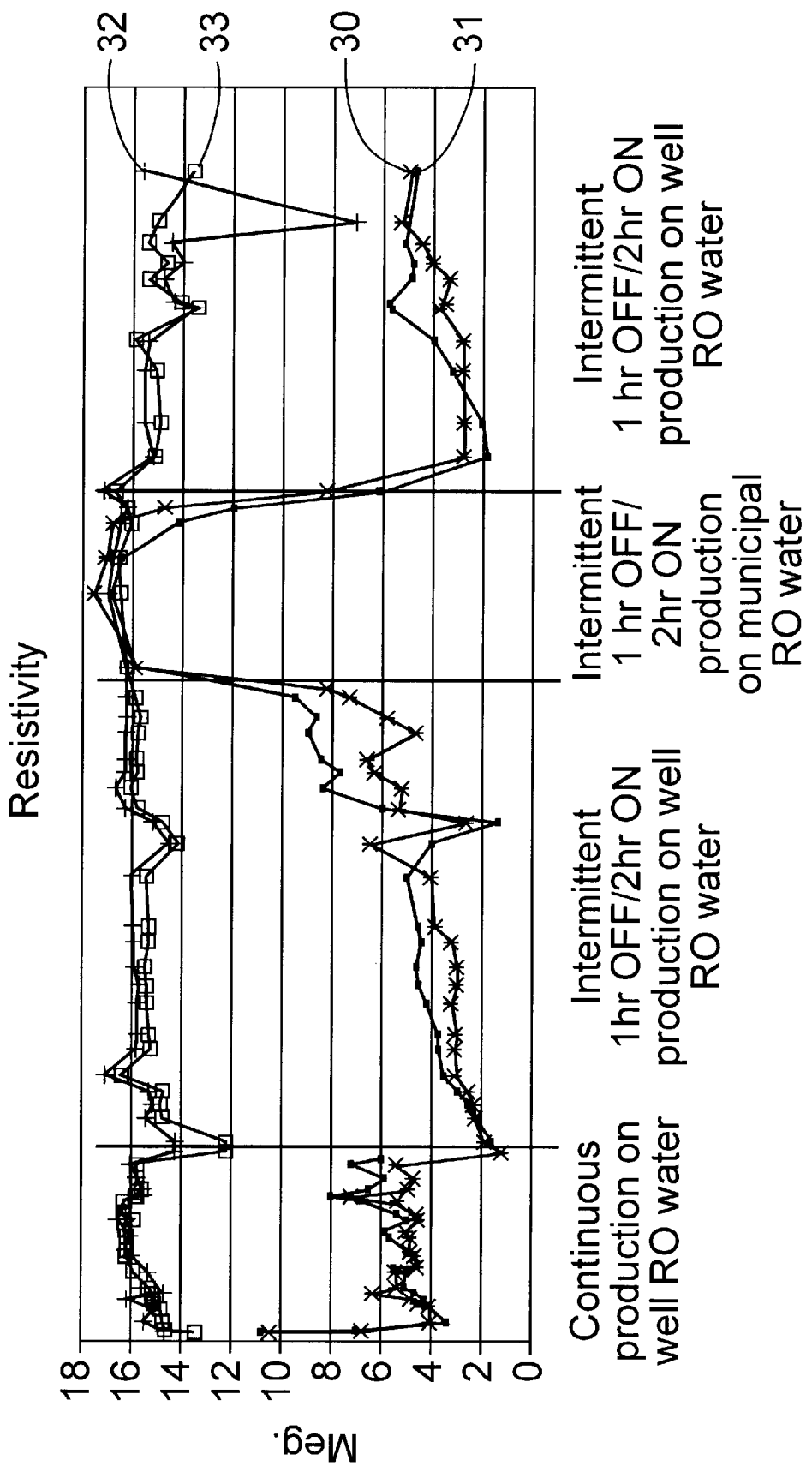
FIG. 4 shows a graph containing data relating to the purity of water obtained by the device of the present invention in comparison to the prior art device over an extended time.

FIG. 4 shows the resistivity of the water produced by the 4 modules over the time of the test. Again the modules of the present invention exhibited much purer and consistently purer water than the modules of the prior art.

What we claim:

1. A system for the electrodeionization of liquids comprising a cathode, an anode spaced apart from the cathode, an electrical potential supplied between the cathode and anode, an anion permeable membrane spaced apart from the anode and defining a first waste channel between the anion permeable membrane and the anode, a cation permeable membrane spaced apart from the cathode and defining a second waste channel between the cation permeable membrane and the cathode, said anion permeable membrane and said cation permeable membrane being adjacent but spaced apart from each other so as to define a product channel, said product channel containing a mixed bed of ion exchange materials, said materials being anion selective and cation selective, said first and second waste channels containing a mixed bed of ion exchange materials, said materials comprising cation selective materials and anion selective materials, wherein the anion selective materials are selected from the group consisting of either only anion materials having low affinity for the selected anion specie(s) or a blend of anion materials having low affinity for the selected anion specie(s) and Type I ion materials.

2. The system of claim 1 wherein the anion permeable membrane and the cation permeable membrane are filled with ion exchange materials.

3. The system of claim 1 wherein the anion permeable membrane and the cation permeable membrane are filled with ion exchange materials and the anion permeable membrane contains an anionic material having relatively low affinity for the anion specie(s) selected.

4. The system of claim 3 wherein the anion material having relatively low affinity is selected from the group consisting of anion materials having weakly basic groups, anion materials having Type II functional groups and mixtures thereof.

5. The system of claim 1 wherein the anion materials having relatively low affinity is selected from the group consisting of anion materials having weakly basic groups, anion materials having Type II functional groups and mixtures thereof.

6. The system of claim 1 wherein the ion exchange material is in the form selected from the group consisting of beads, irregular shaped particles, fibers, rods, fabrics and porous monoliths.

7. The system of claim 1 wherein the ion exchange material is in the form of beads.

8. The system of claim 1 wherein the mixed ion exchange in the product channel is formed of cationic ion exchange materials and anionic ion exchange materials having relatively low affinity for the anion specie(s) selected and wherein the anionic materials having relatively low affinity for the anion specie(s) selected is selected from the group consisting of anion materials having weakly basic groups, anion materials having Type II functional groups and mixtures thereof.

9. The system of claim 1 wherein the anion selective material is all low affinity anion exchange materials.

10. The system of claim 1 wherein the anion selective material is a blend of Type I anion ion exchange material and low affinity anion exchange materials in a ratio of Type I material to low affinity material from about 50:50 to about 1:99.

11. The system of claim 1 wherein the anion selective material is a blend of Type I anion ion exchange material and low affinity anion exchange materials in a ratio of Type I material to low affinity material from about 25:75 to about 20:80.

12. An EDI module comprising one or more product channels, one or more waste channels, two electrodes formed of an anode and a cathode and a mixed bed of ion exchange materials in the one or more product channels and the one or more waste channels, wherein the mixed bed in the one or more waste channels are formed of cationic ion exchange materials and anionic ion exchange materials wherein the anionic materials are selected from the group consisting of either only anionic materials having low affinity for the selected specie(s) or a blend of anionic materials having low affinity for the selected anion specie(s) and Type I ion materials and wherein the anionic materials having relatively low affinity for the anion specie(s) selected are selected from the group consisting of anion materials having weakly basic groups, anion materials having Type II functional groups and mixtures thereof.

13. The module of claim 12 wherein there is one waste channel and one product channel and said waste channel is arranged closest to the electrode that attracts the ion to be removed.

14. The module of claim 12 wherein there is one waste channel and one product channel and said waste channel is arranged closest to the anode.

15. The module of claim 12 wherein there is one waste channel and one product channel and said waste channel is arranged closest to the cathode.

16. The module of claim 12 wherein the mixed ion exchange in the product channel is formed of cationic ion exchange materials and anionic ion exchange materials having relatively low affinity for the anion specie(s) selected and wherein the anionic materials having relatively low affinity for the anion specie(s) selected is selected from the group consisting of anion materials having weakly basic groups, anion materials having Type II functional groups and mixtures thereof.

17. The module of claim 12 wherein there are two or more waste channels and two or more product channels.

18. The module of claim 12 wherein the ion exchange material is in the form selected from the group consisting of beads, irregular shaped particles, fibers, rods, fabrics and porous monoliths.

19. The module of claim 12 wherein the ion exchange material is in the form of beads.

20. The system of claim 12 wherein the anionic material isalllow affinity anion exchange materials.

21. The system of claim 12 wherein the anionic material is a blend of Type I anion ion exchange material and low affinity anion exchange materials in a ratio of Type I material to low affinity material from about 50:50 to about 1:99.

22. The system of claim 12 wherein the anionic material is a blend of Type I anion ion exchange material and low affinity anion exchange materials in a ratio of Type I material to low affinity material from about 25:75 to about 20:80.

* * * * *